US009897183B2

(12) United States Patent
Czepak et al.

(10) Patent No.: US 9,897,183 B2
(45) Date of Patent: Feb. 20, 2018

(54) HYDROSTATIC VARIATOR

(71) Applicants: Parker Hannifin Corporation, Cleveland, OH (US); Kinetics Drive Solutions Inc., Langley, British Columbia (CA)

(72) Inventors: John Czepak, Burnaby (CA); Gerald Dyck, Abbotsford (CA); Per-Ola Vallebrant, Trollhaettan (SE)

(73) Assignees: Parker-Hannifin Corporation, Cleveland, OH (US); Kinetics Drive Solutions Inc., Langley, British Columbia (CA)

( * ) Notice: Subject to any disclaimer, the term of this patent is extended or adjusted under 35 U.S.C. 154(b) by 218 days.

(21) Appl. No.: 14/904,529

(22) PCT Filed: Jul. 11, 2014

(86) PCT No.: PCT/IB2014/063037
§ 371 (c)(1),
(2) Date: Jan. 12, 2016

(87) PCT Pub. No.: WO2015/008204
PCT Pub. Date: Jan. 22, 2015

(65) Prior Publication Data
US 2016/0153533 A1     Jun. 2, 2016

Related U.S. Application Data

(60) Provisional application No. 61/845,988, filed on Jul. 13, 2013.

(51) Int. Cl.
*F16H 39/16* (2006.01)
*F16H 61/423* (2010.01)
(Continued)

(52) U.S. Cl.
CPC ........... *F16H 39/16* (2013.01); *F16H 61/423* (2013.01); *F16H 61/433* (2013.01); *F16H 39/20* (2013.01)

(58) Field of Classification Search
CPC ...... F16H 39/16; F16H 61/423; F16H 61/433; F16H 39/20
(Continued)

(56) References Cited

U.S. PATENT DOCUMENTS 2,967,395 A   1/1961   Foerster
3,834,164 A   9/1974   Ritter
(Continued)

FOREIGN PATENT DOCUMENTS

DE        10 64 311 B      12/2004

OTHER PUBLICATIONS

International Search Report and Written Opinion for corresponding patent application No. PCT/IB2014/063037 dated Dec. 1, 2014.
(Continued)

*Primary Examiner* — Thomas E Lazo
(74) *Attorney, Agent, or Firm* — Renner, Otto, Boisselle & Sklar, LLP (57) ABSTRACT

A hydrostatic variator having a common yoke design and two or more bent axis piston drive units is disclosed in which the rotating group of a drive unit is arranged to be movable relative to the yoke to alter the angle between its drive shaft axis and rotating group axis independent of the other drive unit. This can be accomplished using movable sector plates coupled to the rotating groups that are arcuately movable within the yoke about the axis perpendicular to the respective drive shaft axes of the drive units. Such variators enjoy the response and packaging advantages of a common yoke design while still allowing dynamic adjustment of system size. In turn, varying system size allows for efficiency to be improved at conditions other than at the maximum design torque.

15 Claims, 9 Drawing Sheets

(51) Int. Cl.
*F16H 61/433* (2010.01)
*F16H 39/20* (2006.01)

(58) Field of Classification Search
USPC .................. 60/487, 491, 490; 92/56, 57, 58
See application file for complete search history.

(56) References Cited

U.S. PATENT DOCUMENTS

| | | | | |
|---|---|---|---|---|
| 6,203,283 | B1 * | 3/2001 | Fleming | .................. F01B 3/102 417/218 |
| 6,945,041 | B2 * | 9/2005 | Fleming | .................. F16H 39/08 60/484 |
| 7,159,395 | B2 * | 1/2007 | Fleming | ................ F03C 1/0639 60/487 |
| 8,096,228 | B1 * | 1/2012 | Wright | .................... F16H 39/08 91/505 |
| 8,240,145 | B2 * | 8/2012 | Dyck | ..................... F16H 39/08 60/490 |
| 8,414,439 | B2 | 4/2013 | Bailly et al. | |
| 2010/0212309 | A1 | 8/2010 | Dyck et al. | |

OTHER PUBLICATIONS

Examination Report for corresponding Canadian Patent Application No. 2,918,152 dated May 10, 2017.

* cited by examiner

HYDROSTATIC VARIATOR

INTRODUCTION

The present invention relates generally to a hydrostatic variator.

Although many promising alternative power sources are being developed for motor vehicles, the predominant power source today is the internal combustion engine. Current IC-driven designs have evolved substantially over the last century but there is still room for improvement. The use of continuously variable and infinitely variable transmissions (CVTs and IVTs) allows the engine to operate at its peak performance point improving performance as well as efficiency while reducing the impact on the environment.

In a split path IVT, power from the engine is split into two branches and recombined at the output. One branch is purely mechanical and may consist of as little as a shaft and a pair of gears. The other branch consists of a continuously variable device able to change the speed and torque ratios of the transmission. Power will flow exclusively through the mechanical branch, through the variator branch or a blend of the two. Since the transmission will be the most efficient when most or all of the power flows thru the mechanical branch, the transmission will be designed such that this condition occurs at the most frequently used operating point in the duty cycle.

Several different devices such as toroidal drives to electric motor/generator sets have been used to create a continuously variable gearset or "variator" for the IVT. Hydrostatic variators are currently the best suited of these to handle the power demands of large on and off road trucks and construction equipment. In addition, mobile hydraulics technology is very mature offering proven reliability as well a wide range of readily available components.

In a hydrostatic variator, one or both of the pump and motor are of a variable displacement design. The pump and motor are in fluid communication such that fluid from the pump drives the motor. By changing the displacement ratio between the pump and motor the speed and torque ratios between input and output shafts can be varied. Typically, an electronic controller regulates the pump and motor displacements depending on operator demands and drive train conditions. The sum of the pump and motor displacements is known as the system size.

Figure 1:
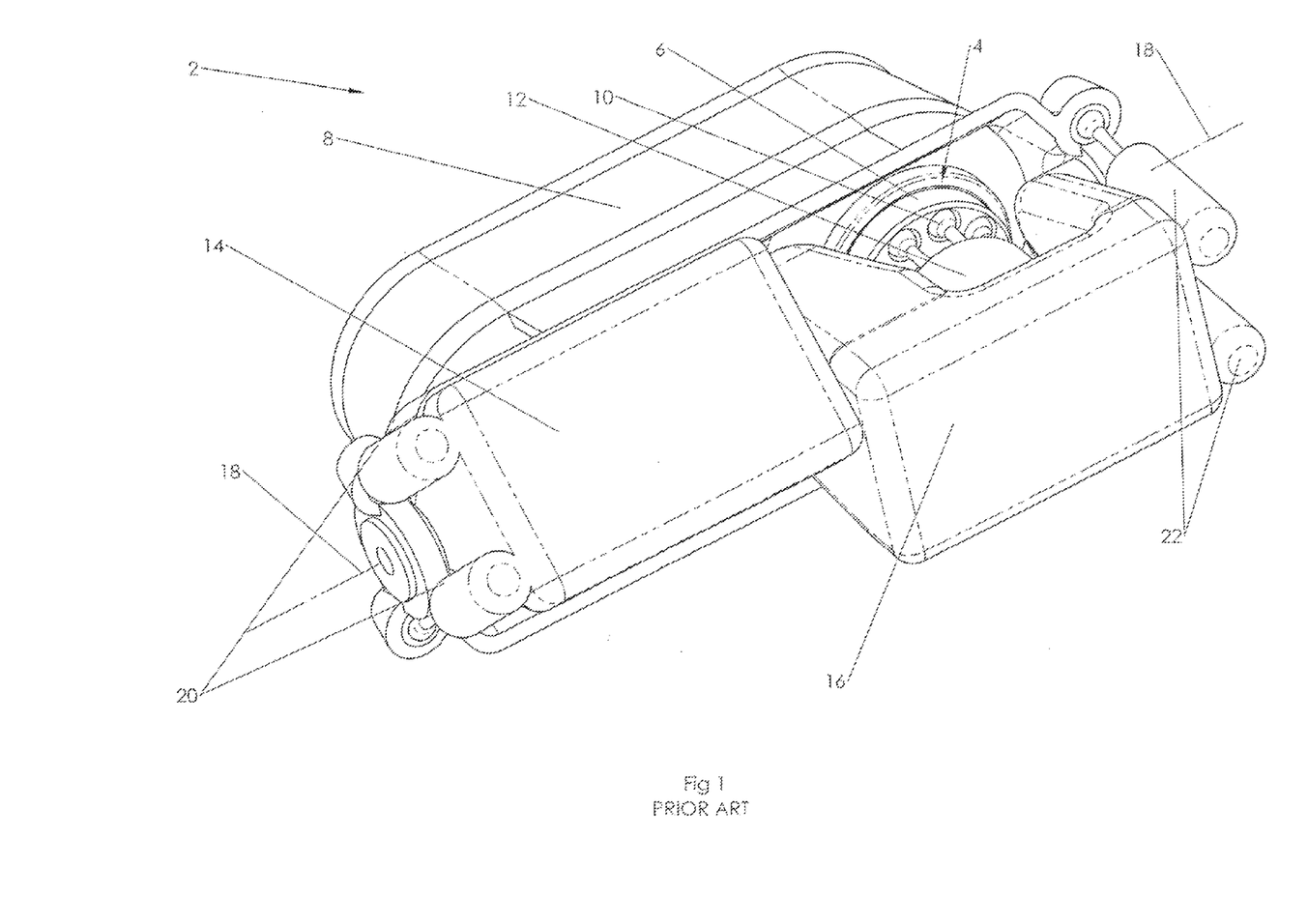
FIG. 1 illustrates a prior art hydrostatic variator in US 2010/0212309.

FIG. 1 illustrates a prior art hydrostatic variator described in US 2010/0212309. In FIG. 1, variator 2 comprises a first bent axis unit or axial piston unit and a second bent axis unit or axial piston unit 4. It is noted that the first bent axis unit or axial piston unit is not visible in the figure. Output/input shafts 6 of the respective bent axis units are positioned within housing 8 to retain the outputs shafts in a predetermined relative position. Each of the first bent axis unit and the second bent axis unit 4 includes a rotating group of pistons 10 coupled to the respective output/input shafts 6 and are movable within cylinders located in respective cylinder blocks 12. The cylinder blocks 12 are rotatable within respective yokes 14, 16 that also provide fluid channels between respective cylinder blocks 12 of the first bent axis unit and the second bent axis unit 4. Each of the yokes 14, 16 are independently rotatable about axis 18 such that displacement of fluid from the first bent axis unit to the second bent axis unit or vice versa can be varied. The displacement of each bent axis unit depends on the rotational angle of its yoke relative to the housing. The position of each yoke is control independently by its own servo assembly (20 or 22).

Most split path IVT power train control algorithms are set up for relatively simplistic power management schemes: maintain the engine either at peak power or at its point of least fuel consumption. This approach does create significant gains over stepped ratio transmissions but more refined control is required to realize the full potential of an IVT.

The variator of a split path IVT must be designed to handle as much as or more than half of the input power to the transmission. However, depending on the loading cycle of the vehicle, full power may not be required all the time. A hydraulic drive system which is "too large" for the amount of power being transferred will not run as efficiently as a smaller system. A method commonly employed to improve this efficiency under partially loaded conditions is to reduce the pump and motor displacement proportionately (i.e. reducing system size) to increase system pressure while maintaining the desired speed ratio.

In current variator systems using independently adjustable pumps and motors, a microcontroller controls the speed and torque ratios via hydroelectric servos. Problems arise when multiple servos are required to respond quickly and in a synchronized manner. Stick/slip conditions can occur which vary with system pressure; creating a control algorithm to address all situations can be complex and difficult. In the current state of the art, servo mechanisms have limitations with regards to response to transient forces. All of this acids a degree of unpredictability to the system.

One approach to create a more predictable system is to reduce the number of interfaces where stick/slip can occur. This can be done by using a common yoke for the pump and motor rather than a separate one for each, for instance such as the arrangement shown in DE1064311B. The pump and motor are hydraulically close coupled which leads to a smaller physical envelope, and dynamic rotary seals between pump and motor are not required. As well, only one servo assembly is required to move both pump and motor. The problem with this approach is the angle between the pump and motor yokes is fixed, and hence the system size is fixed. When applied in a split path transmission, potential efficiency gains by altering system size are not possible.

Therefore, there is a need for a hydrostatic variator which can combine the response and packaging advantages of a common yoke design while still allowing dynamic adjustment of system size. The present invention addresses these needs and provides other related benefits as described below.

SUMMARY OF THE INVENTION

A hydrostatic variator providing dynamic adjustment of system size in a common yoke design comprises a housing, first and second bent axis piston drive units which each comprise a rotating group, a yoke common to both drive units, and a yoke servo assembly to position the yoke relative to the housing. The respective rotating groups in each piston drive unit are arranged to rotate within a yoke. And the yoke includes one or more fluid channels for fluid communication between the first and second bent axis piston drive units. The yoke is rotatable relative to the housing about a yoke axis perpendicular to both a drive shaft of the first bent axis piston drive unit and to a drive shaft of the second bent axis piston drive unit to simultaneously alter an angle between the drive shaft axis and the rotating group axis of each of the first and second bent axis piston drive units. For purposes of dynamic adjustment, the rotating group of the first bent axis piston drive unit is arranged to be movable relative to the yoke in order to alter the angle between the drive shaft axis and the rotating group axis of the first bent axis piston drive unit independent of the second bent axis piston drive unit. Since the system size can be varied, efficiency can be improved for conditions other than the maximum design torque of the variator.

In one embodiment, dynamic adjustment can be achieved by employing a first movable sector plate that is coupled to the rotating group of the first bent axis piston drive unit and that is arcuately movable within the yoke about a first sector plate axis perpendicular to the drive shaft axis of the first bent axis piston drive unit. (The first sector plate axis and the yoke axis may be the same or different axes.) A first servo assembly can be employed to position the first movable sector plate relative to the yoke. Further, the first movable sector plate can comprise an elongate opening in order to allow fluid to flow between the rotating group of the first bent axis piston drive unit and the fluid channel of the yoke independent of the arcuate position of the first movable sector plate.

In another embodiment, the rotating group of the second bent axis piston drive unit can be arranged, or also be arranged, to be movable relative to the yoke to alter the angle between the drive shaft axis and the rotating group axis of the second bent axis piston drive unit independent of the first bent axis piston drive unit. With adjustment capability for both rotating groups, the possible range of adjustment of system size of the variator can be increased.

As with the first bent axis piston drive unit, a second movable sector plate can thus be coupled to the rotating group of the second bent axis piston drive unit that is arcuately movable within the yoke about a second sector plate axis perpendicular to the drive shaft axis of the second bent axis piston drive unit. (As before, the second sector plate axis and the yoke axis may be the same or different axes.) In a preferred embodiment, both first and second movable sector plates are employed. A second servo assembly can be employed to position the second movable sector plate relative to the yoke. And as before, the second movable sector plate can comprise an elongate opening in order to allow fluid to flow between the rotating group of the second bent axis piston drive unit and the fluid channel of the yoke independent of the arcuate position of the second movable sector plate.

In certain exemplary practical embodiments, the yoke can be rotatable to simultaneously alter the angle between the drive shaft axis and the rotating group axis of each of the first and second bent axis piston drive units over a range from at least 0 to about 40 degrees. And the angle between the drive shaft axis and the rotating group axis of the first bent axis piston drive unit can be altered over the range from at least 0 to about 20 degrees independent of the second bent axis piston drive unit.

In the first and second bent axis piston drive units, the axes of the drive shafts can be parallel, while the axes of the rotating groups may not be parallel.

Depending on the intended application, either one of the first and second bent axis piston drive units can serve as a pump and the other of the first and second bent axis piston drive units can serve as a motor.

In an associated method of the invention, the angle between the drive shaft axis and the rotating group axis of a first bent axis piston drive unit is altered independent of a second bent axis piston drive unit in a hydrostatic variator having a common yoke design. The method comprises arranging the rotating group of the first bent axis piston drive unit to be movable relative to the yoke to alter the angle between the drive shaft axis and the rotating group axis of the first bent axis piston drive unit independent of the second bent axis piston drive unit. In one embodiment, a first movable sector plate is incorporated that is arcuately movable within the yoke about the axis perpendicular to the drive shaft axis of the first bent axis piston drive unit, and the first movable sector plate is coupled to the rotating group of the first bent axis piston drive unit. In another embodiment, a second movable sector plate is instead or is additionally incorporated and coupled in a like manner in the second bent axis piston drive unit. In other embodiments, other means may be employed to arrange the rotating group of the first and/or second bent axis piston drive units so as to be movable relative to the yoke, and thereby obtain dynamic adjustment of angle between the first and second bent axis piston drive units. For instance, miniature yoke configurations may be considered within the main yoke of the variator.

BRIEF DESCRIPTION OF THE DRAWINGS

For a better understanding of the invention and to show how the same may be carried into effect reference is now made by way of example to the accompanying drawings in which.

DETAILED DESCRIPTION

As is commonly used in the art, herein "system size" refers to the sum of the pump and motor displacements in a hydrostatic variator.

Figure 2:
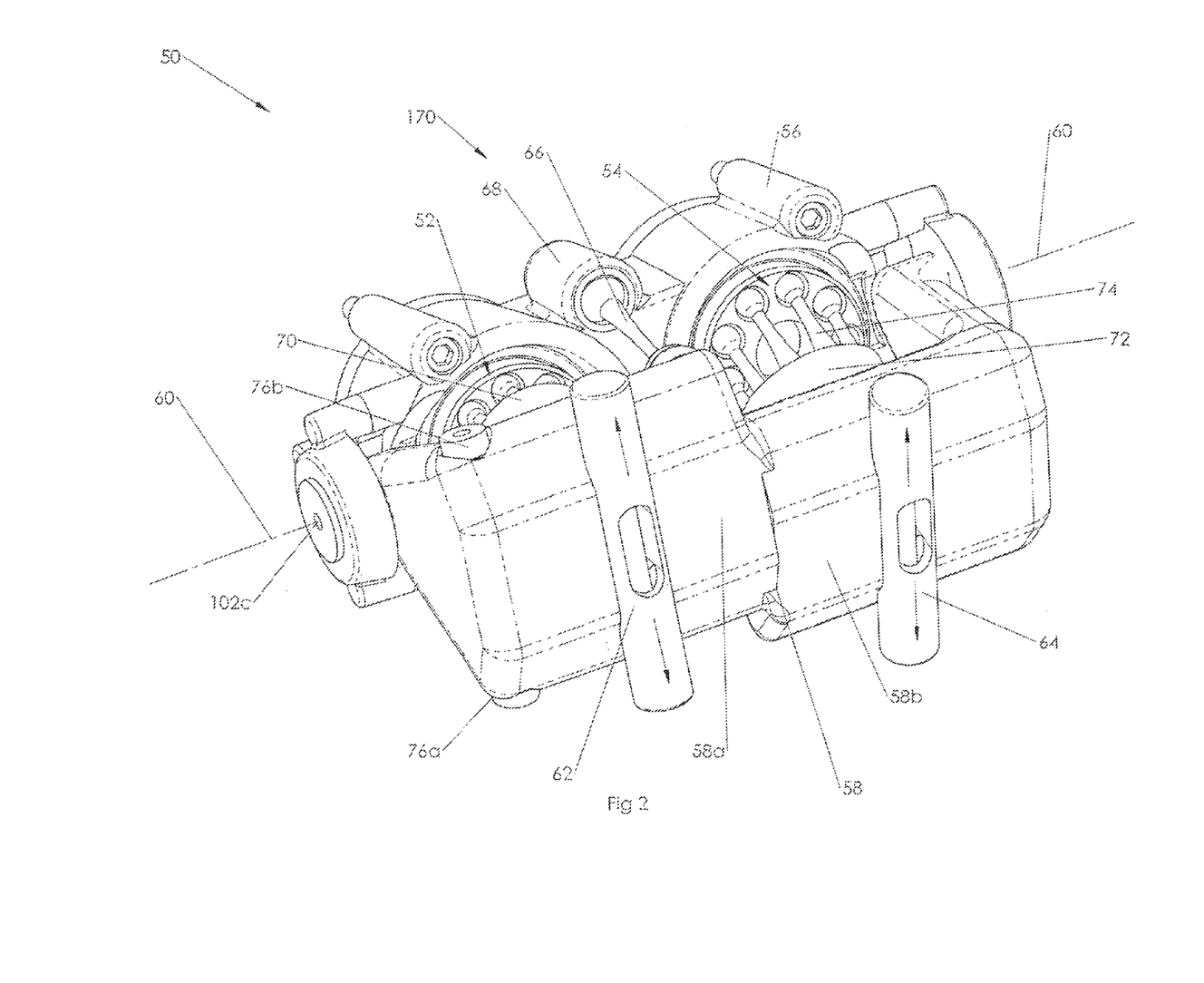
FIG. 2 illustrates a perspective view of a hydrostatic variator according to an embodiment of the invention.

FIG. 2 illustrates a perspective view of a hydrostatic variator or hydraulic module 50 according to an embodiment of the invention. Hydrostatic variator 50 comprises a housing 56 that supports first bent axis piston drive unit 52, shown on the left hand side of the figure and second bent axis piston drive unit 54 shown on the right hand side of the figure. Housing 56 supports a distal end of each of the bent axis piston drive units 52, 54 and allows each of the bent axis piston drive units 52, 54 to rotate relative to the housing 56. Housing 56 is manufactured such that output shafts (not shown in the figure) of each of the bent axis piston drive units 52, 54 are parallel to one another and are generally perpendicular to the housing. Each of the bent axis piston drive units 52, 54 includes at least two pistons 74 (in this example, nine pistons) that are coupled to a respective output shaft (not shown in the figure) and are movable in and out of a cylinder block 72. A distal end of the piston includes a spherical portion to allow the angle between the piston and the shaft to be altered while the shaft rotates. (In other embodiments, the output shafts need not be parallel.)

Hydrostatic variator 50 further comprises yoke 58, which may be referred to as a common yoke, that supports a proximal end of each of the bent axis piston drive units 52, 54 and allows each of bent axis piston drive units 52, 54 to rotate relative to yoke 58. Yoke 58 is manufactured such that it includes two portions 58*a*, 58*b* that are joined together to form a single or common yoke and that are angularly offset about axis 60 with respect to one another. In this example, yoke portions 58*a*, 58*b* are offset by an angle of 20 degrees, but other offset angles are envisaged. Therefore, an angle between an output (or input) shaft (not shown in the figure) and a cylinder block 70 of first bent axis piston drive unit 52 will be different than an angle between an output (or input) shaft (not shown in the figure) and cylinder block 72 of second bent axis piston drive unit 54.

Yoke 58 is rotatable with respect to housing 56 about axis 60. By rotating yoke 58 in this manner, the angle between an output (or input) shaft and cylinder block 70, 72 of each of first and second bent axis piston drive units 52, 54 can be varied, as is described in more detail below. The angle of the yoke may be adjusted in various ways, such as by use of electro-mechanical jack screws, rotary stepper motors, etc. Here, a yoke servo assembly 170 consisting of a pair of setting pistons 66 (visible in FIG. 2) and 80 (not visible in FIG. 2) is coupled at a distal end to yoke 58 and a proximal end can be moved in and out of cylinder 68 (visible in FIG. 2) and 84 (not visible in FIG. 2) positioned on the housing to rotate yoke 58 with respect to housing 56. Yoke servo assembly 66 is generally cylindrical and is driven using a suitable hydraulic fluid, e.g., mineral oil. It will be appreciated that the piston may be positioned such that the distal end is coupled to housing 56 and the proximal end is movable within a cylinder positioned on yoke 58. The housing also includes relief valves 76*a*, 76*b* that are used for introducing hydraulic fluid into or removing hydraulic fluid from yoke 58. (Valves 76*a*, 76*b* may also be used for relieving pressure from the high pressure port to the low pressure port. Valves 76*a*, 76*b* are used in combination with a channel within yoke 58 that is opened or closed using the valves. A boost port 102*c* to provide make-up oil for leakage past the dynamic seals may also be incorporated in yoke 58.)

Yoke 58 also includes two servo assemblies or setting mechanisms 62, 64. Each servo assembly 62, 64 includes a piston and a cylinder, as described below. First servo assembly 62 is movable, as indicated by the arrows on the figure, to move cylinder block 70 arcuately within yoke 58, and relative to yoke 58 and independently of cylinder block 72 of second bent axis piston drive unit 54. A second servo assembly 64 is movable, as indicated by the arrows on the figure, to move cylinder block 72 arcuately within yoke 58, and relative to yoke 58 and independently of cylinder block 70 of first bent axis piston drive unit 52. Arcuately is used to describe the movement of cylinder blocks 70, 72 because cylinder blocks 70, 72 are moved in an arc at a fixed distance from the rotational axis of yoke 58.

Figure 3:
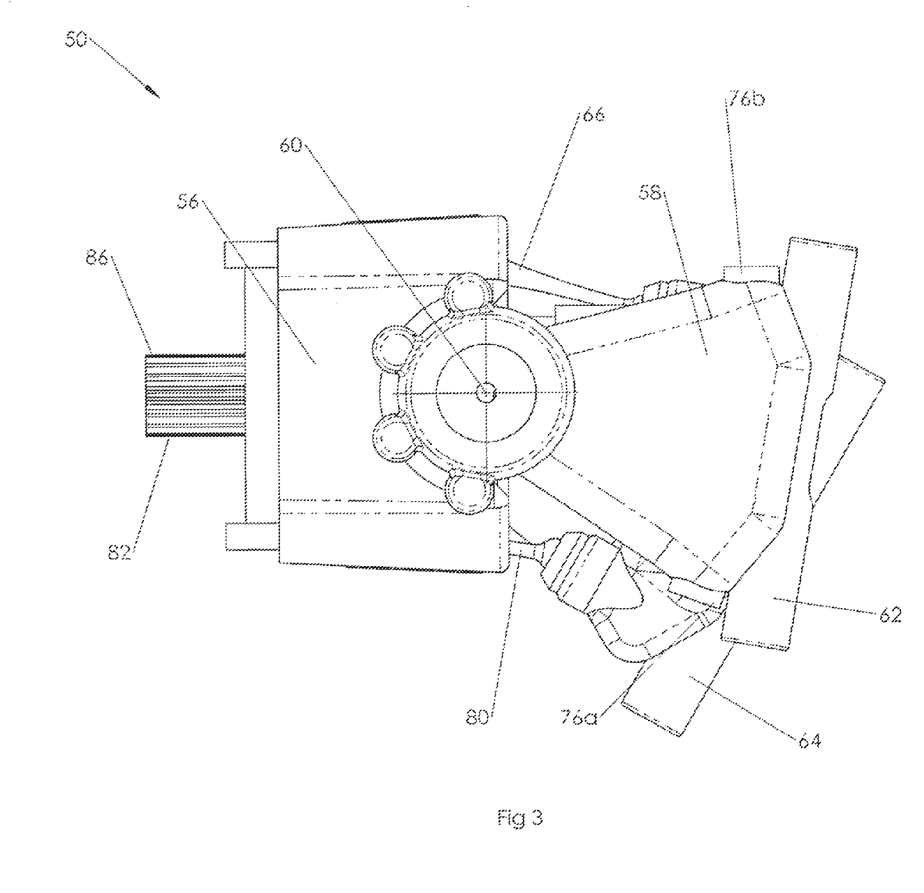
FIG. 3 illustrates a side view of the hydrostatic variator of FIG. 2.

FIG. 3 illustrates a side view of the hydrostatic variator of FIG. 2. The reference numerals used in FIG. 2 are also used in FIG. 3 to identify the same features. Setting piston 80 and cylinder 84 are illustrated in the figure. In operation, yoke setting pistons 66, 80 are operated antagonistically. That is to say that in the figure, yoke setting piston 66 is used to rotate yoke 58 in a clockwise direction and yoke setting piston 80 is used to rotate yoke 58 in a counter-clockwise direction. Output shaft 82 of first bent axis piston drive unit 52 is illustrated in the figure. Shaft 82 includes a number of splines 86 for coupling the shaft to another device or assembly.

Figure 4:
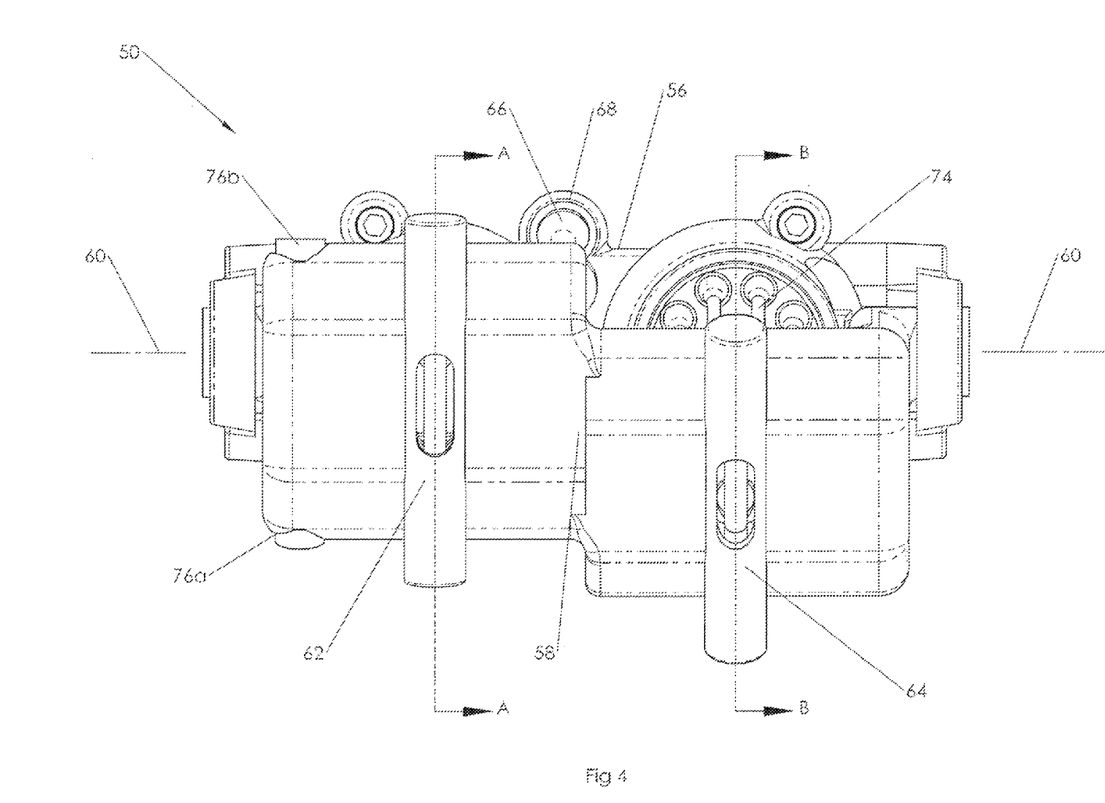
FIG. 4 illustrates a front view of the hydrostatic variator of FIG. 2.

FIG. 4 illustrates a front view of the hydrostatic variator of FIG. 2. The reference numerals used in FIG. 2 are also used in FIG. 4 to identify the same features. FIG. 4 also indicates the locations of cross sections A-A and B-B which appear in subsequent Figures.

Figure 5:
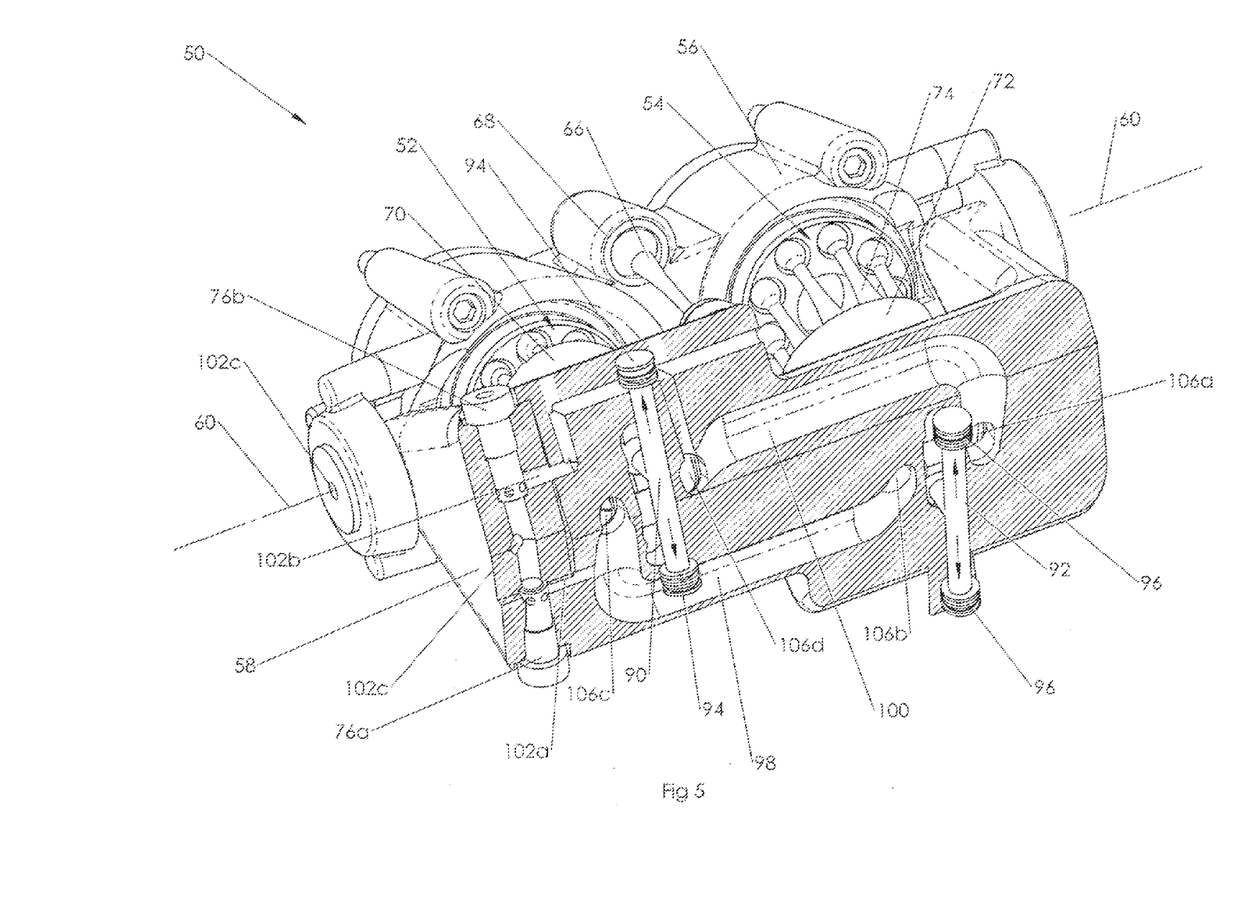
FIG. 5 illustrates a perspective view of the hydrostatic variator shown in FIG. 2 with a section of the yoke removed to reveal fluid connection channels formed within the yoke.

FIG. 5 illustrates a perspective view of the hydrostatic variator of FIG. 2 with a section of yoke 58 removed to reveal the fluid connection channels formed within yoke 58. The cut surface of yoke 58 is illustrated in the figure by the diagonal hatching. The reference numerals used in FIG. 2 are also used in FIG. 5 to identify the same features.

In FIG. 5, a first and a second piston 90, 92 of the fast and second servo assemblies 62, 64 are illustrated. Pistons 90, 92 are movable in the directions illustrated by the arrows in the figure. First and second pistons 90, 92 are movable within a respective cylinder (not shown in the figure) and are coupled to respective first and second bent axis piston drive units 52, 54 such that when first or second piston 90, 92 is moved as indicated by the arrows in the figure, the cylinder block of the respective bent axis unit moves with the respective piston 90, 92. Each piston 90, 92 includes a lip seal or o-ring seal 94, 96 at each end which is used to seal pistons 90, 92 within their cylinders (not shown). Each piston 90, 92 is effectively two antagonistic pistons, such that an upper piston portion (according to the orientation of the figure) is operated to move the position in a downward direction (according to the orientation of the figure) and a lower piston portion (according to the orientation of the figure) is operated to move the position in a upward direction (according to the orientation of the figure). Pistons 90, 92 are driven using a suitable hydraulic fluid, e.g., mineral oil.

First fluid channel 98 and second fluid channel 100 are illustrated in the figure. First and second fluid channels 98, 100 fluidically couple the first and second bent axis piston drive units 52, 54. That is to say that the first and second fluid channels 98, 100 provide fluid communication between the first and second bent axis piston drive units 52, 54. Through holes 106*a*, 106*b*, 106*c*, 106*d* are provided in yoke 58 at each end of each fluid channels 98, 100 going between fluid channels 98, 100 and bent axis piston drive units 52, 54. During operation, for example, first fluid channel 98 carries fluid from first bent axis piston drive unit 52 to second bent axis piston drive unit 54 and second fluid channel 100 carries fluid from second bent axis piston drive unit 54 to first bent axis piston drive unit 52. However, this will depend on the rotational direction of each of bent axis piston drive units 52, 54.

FIG. 5 and the aforementioned description relate to a closed loop system. An open loop system familiar to those skilled in the art may also be employed. With an open loop configuration, one of fluid channels 98 or 100 would be eliminated and replaced with a direct opening to the case which contains the whole assembly and would be flooded with hydraulic fluid.

Figure 6:
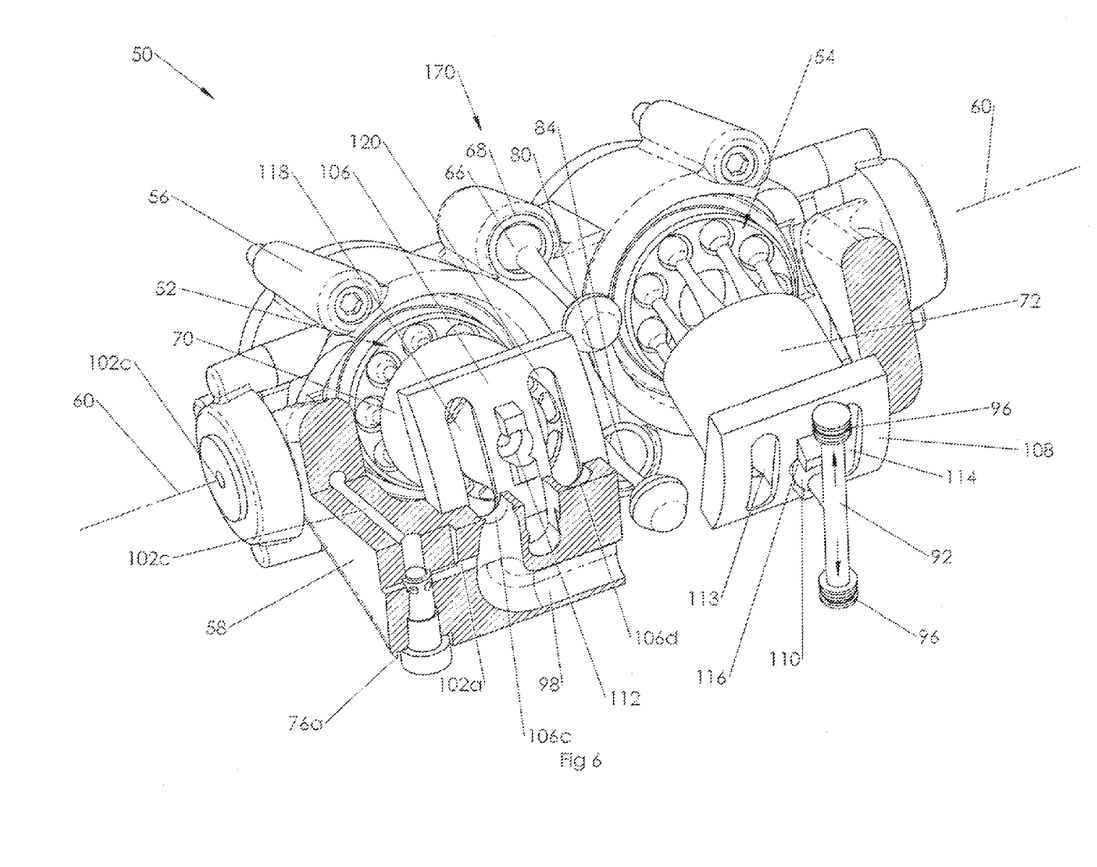
FIG. 6 illustrates a perspective view of the hydrostatic variator shown in FIG. 2 with a section of the yoke removed to reveal the two bent axis piston drive units.

FIG. 6 illustrates a perspective view of the hydrostatic variator of FIG. 2 with a section of yoke 58 removed to reveal the bent axis piston drive units 52, 54. The cut surface of yoke 58 is illustrated in the figure by the diagonal hatching. The reference numerals used in FIG. 2 are also used in FIG. 6 to identify the same features.

First bent axis piston drive unit 52 is illustrated on the left hand side of variator 50. First bent axis unit 52 includes a first sector plate 106 that is movable in an arc within the yoke 58 about axis 60. (Although drawn this way here, the first sector plate axis that the first sector plate rotates about does not have to be the same as yoke axis 60 that the yoke rotates about. It could be offset and parallel to 60). First sector plate 106 is coupled to cylinder block 70 of first bent axis piston drive unit 52 such that cylinder block 70 is able to rotate with respect to sector plate 106. First sector plate 106 includes a coupling or socket 112 to allow a cooperating coupling or ball of piston 90 to be coupled together (piston 90 is not shown in the figure). Here, a ball and socket 112 arrangement is used so that the movement of piston 90 can be linear and the movement of sector plate 106 can be arcuate. First sector plate 106 includes first and second through holes 118, 120, such that fluid from cylinder block 70 of first bent axis piston drive unit 52 can pass through sector plate 106 to fluid channels 98, 100 (channel 100 is not shown in the figure) in yoke 58. Through holes 118, 120 are elongated so that as sector plate 106 is moved arcuately at least a portion of the openings 118, 120 are aligned with through holes 106c, 106d in yoke 58 (through hole 106d is not shown in this figure). In operation, when piston 90 is moved upward or downward, first sector plate 106 is moved arcuately clockwise or counter clockwise.

Second bent axis piston drive unit 54 is illustrated on the right hand side of variator 50. Second bent axis piston drive unit 54 includes second sector plate 108 that is movable in an arc within Yoke 58 about axis 60. (Again, although drawn this way here, the second sector plate axis that the second sector plate rotates about does not have to be the same as yoke axis 60 that the yoke rotates about. It could be offset and parallel to 60). Second sector plate 108 is coupled to cylinder block 72 of second bent axis piston drive unit 54 such that cylinder block 72 is able to rotate with respect to second sector plate 108. Second sector plate 108 includes a coupling or socket 116 to allow a cooperating coupling or ball 110 of piston 92 to be coupled together. A ball 110 and socket 116 arrangement is used so that the movement of piston 92 can be linear and the movement of second sector plate 108 can be arcuate. Second sector plate 108 also includes first and second through holes 112, 114, such that fluid from cylinder block 72 of second bent axis piston drive unit 54 can pass through second sector plate 108 to fluid channels 98, 100 (channel 100 not shown in the figure) in yoke 58. Through holes 112, 114 are elongate so that as second sector plate 108 is moved arcuately at least a portion of the openings 112, 114 are aligned with through holes 106a, 106b in yoke 58 (through holes 106a, 106b are not shown in this figure). In operation, when piston 92 is moved upward or downward, second sector plate 108 is moved arcuately clockwise or counter clockwise.

Figure 7:
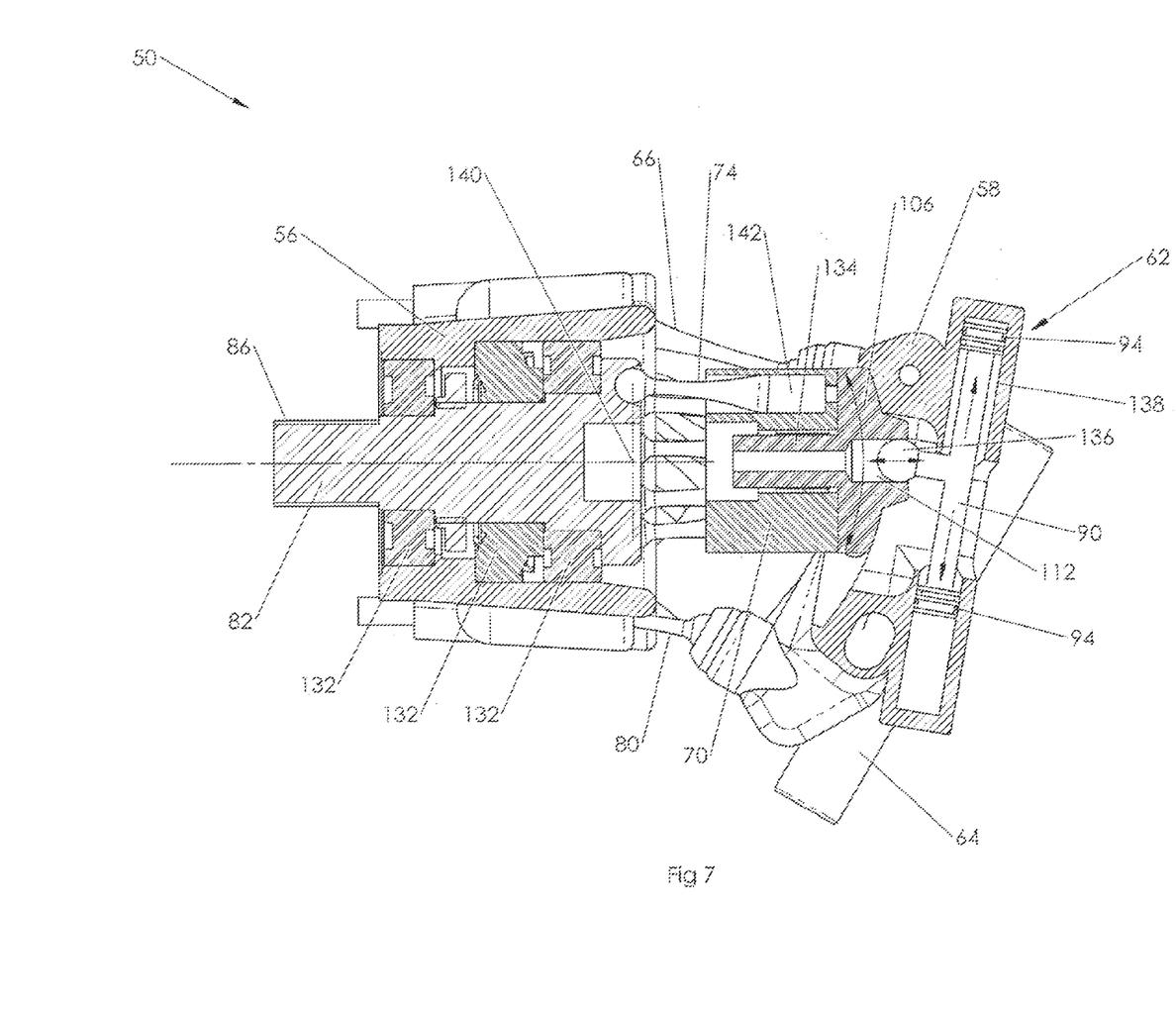
FIG. 7 illustrates a cross section A-A through the hydrostatic variator shown in FIG. 4.

FIG. 7 illustrates a cross section A-A through hydrostatic variator 50 shown in FIG. 2. The location of cross section A-A appears in FIG. 4. In particular, the cross section illustrates a section through first bent axis piston chive unit 52. The cut surface of the various elements is illustrated in the figure by the diagonal hatching. The reference numerals used in FIGS. 1 to 6 are also used in FIG. 7 to identify the same features.

Shaft 82 is positioned in housing 56 using one or more bearings 132 to allow the shaft to freely rotate. Piston assembly 62 in the figure is shown in cross section such piston 90 and associated seal 94 can be viewed with cylindrical chamber or cylinder 138. Piston 90 includes ball 136 that is coupled to socket 112 of first sector plate 106, such that when piston 90 is moved in a linear manner, first sector plate 106 is moved in an arcuate manner, as illustrated in the figure. The socket or opening 112 in first sector plate 106 is elongate to allow movement of the ball 136 of the piston in relation to first sector plate 106, as illustrated by the arrows in the figure, as the piston is moved.

First sector plate 106 of first bent axis piston drive unit 52 includes a spindle 134 that is located in the centre of cylinder block 70 to allow cylinder block 70 to rotate. First sector plate 106 is located in an elongate recess in yoke 58 which provides a track in which first sector plate 106 can be moved in an arcuate manner.

Figure 8:
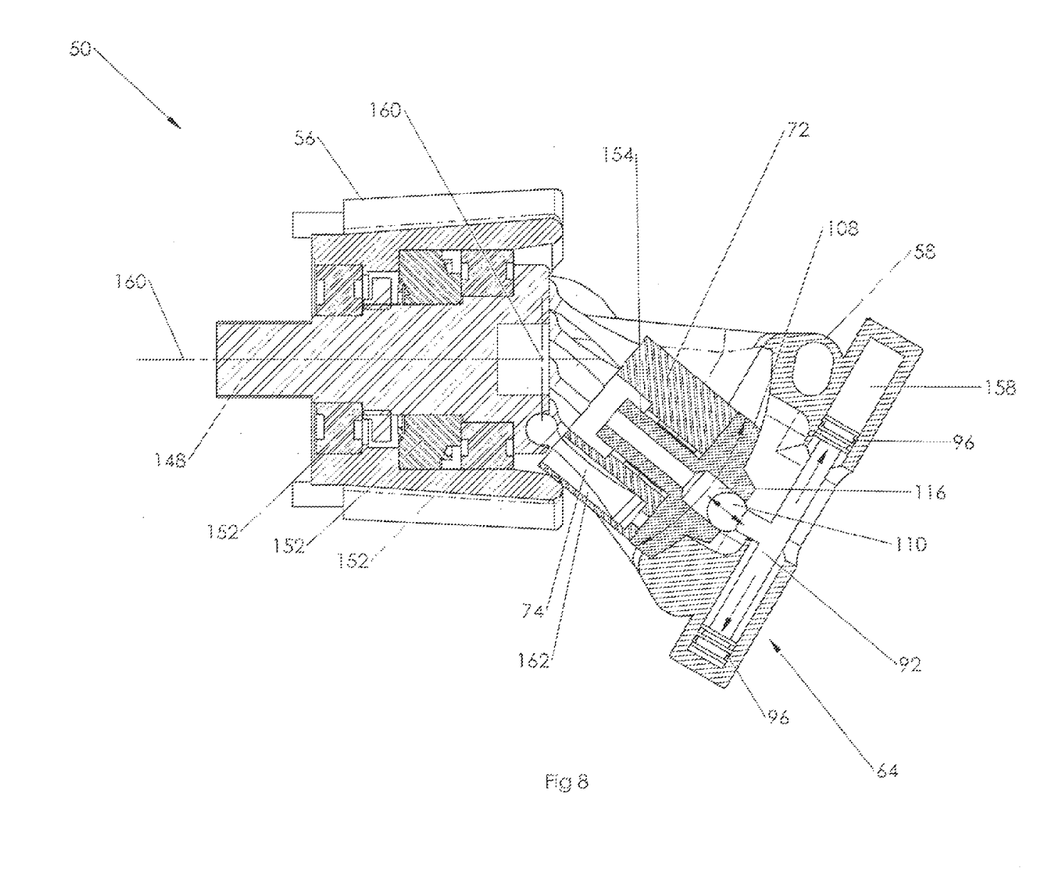
FIG. 8 illustrates a cross section B-B through the hydrostatic variator illustrated in FIG. 4.

FIG. 8 illustrates a cross section B-B through hydrostatic variator 50 shown in FIG. 2. The location of cross section B-B appears in FIG. 4. In particular the cross section illustrates a section through second bent axis piston drive unit 54. The cut surface of the various elements is illustrated in the figure by the diagonal hatching. The reference numerals used in FIGS. 1 to 6 are also used in FIG. 8 to identify the same features.

The components, configuration and operation of the elements of second bent axis piston drive unit 54 shown in FIG. 8 are similar to those shown in the cross section through first bent axis piston drive unit 52 shown in FIG. 7. Shown is shaft 148 positioned in housing 56 using one or more bearings 152 and includes a plurality of splines 164. The axis of rotation 160 of shaft 148 is illustrated in the figure. Piston assembly 64 is shown in cross section such piston 92 and associated seals 96 can be viewed with a cylindrical chamber or cylinder 158. Piston 92 includes a ball 110 that is coupled to the socket 116 of second sector plate 108. Second sector plate 108 includes a spindle 154 and one or more seals (not shown in the figure). Cylinder block 72 here includes nine cylinders 162 and nine respective pistons 74.

Figure 9:
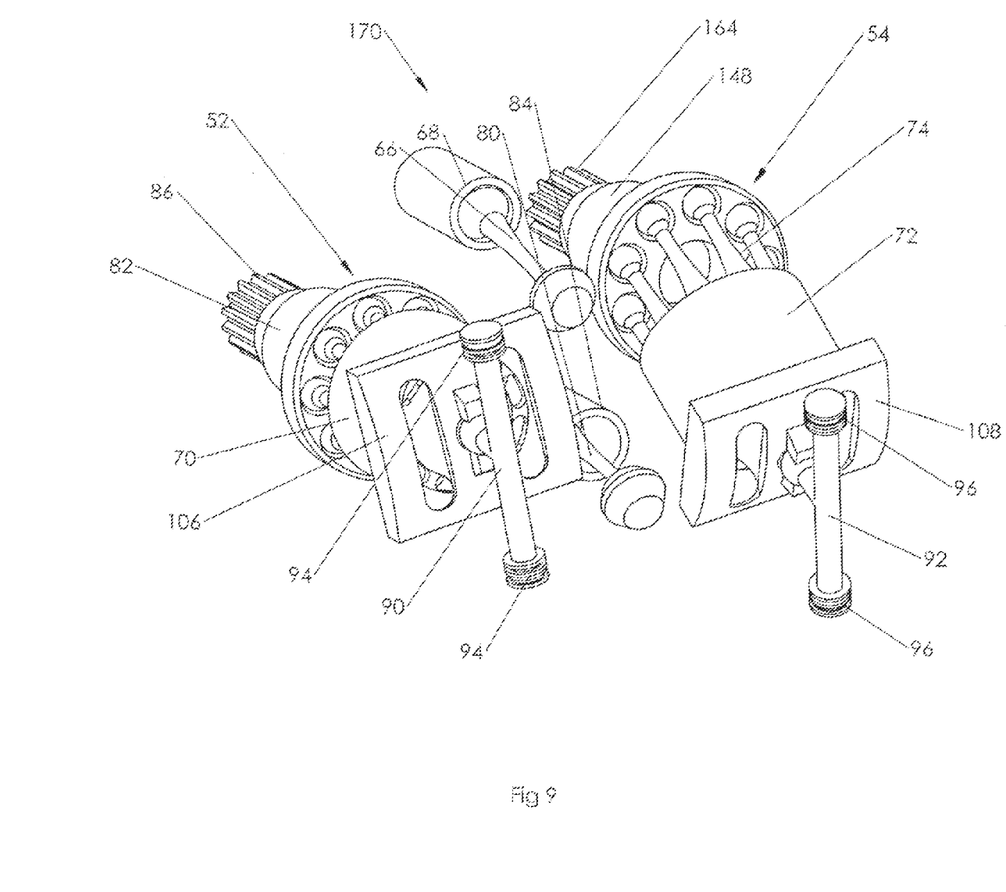
FIG. 9 illustrates the first and second bent axis piston drive units and sector plates of the hydrostatic variator of FIG. 2 with the housing and the yoke removed.

FIG. 9 illustrates only the first and second bent axis piston drive units 52, 54 with housing 56 and yoke 58 removed. The reference numerals used in FIGS. 1 to 8 are also used in FIG. 8 to identify the same features.

The operation of variator 50 is now described using the elements described in association with FIGS. 2 to 9.

In operation, first bent axis piston drive unit 52 can be operated as a pump and second bent axis piston drive unit 54 can be operated as a motor. It will be appreciated that either bent axis piston drive units can be operated as a pump or a motor.

While shaft 148 of the pump is rotated, the angle between shafts 82, 148 and spindles 134, 154 can be adjusted simultaneously by rotating yoke 58 about yoke axis 60 using yoke servo assembly 170. Also, the angle between shafts 82, 148 and spindles 134, 154 can be adjusted independently using piston assemblies 90, 92 and cylinders 138, 158 of the individual first and second servo assemblies 62, 64. As previously described, the movement of the individual first and second servo assemblies moves sector plates 106, 108 in an arcuate manner within and relative to yoke 58. Therefore, by rotating yoke 58, the speed ratio between the input shaft 82 (the shaft 82 of first bent axis piston drive unit 52) and the output shaft 148 (the shaft 148 of the second bent axis piston drive unit 54) is altered and by moving the first and/or second sector plates 106, 108, the size of the system is altered. By the system size, the efficiency can be maximized for conditions other than the maximum design torque. When running at smaller system sizes, it is possible to absorb small shocks to the system by "growing" the system size in response to the torque spike felt at the output. This could reduce and/or eliminate severe pressure spikes.

Another possible embodiment of the invention involves only a single movable sector plate, i.e. the angle of only one of the rotating groups is variable relative to the yoke, while the other rotating group has no movable sector plate and its angle with respect to the yoke is fixed. This of course reduces the possible differential angle range that may be achieved if two sector plates are employed.

With the present invention, advantageously the range of angle adjustment is similar to that of variators with independent yokes. In this regard, present bent axis piston drive units have a practical limit of about 40° to 45° because of limitations of the piston and ball socket geometry employed. The additional adjustment provided by the sector plates is expected to be slightly less than half of the full yoke displacement. Thus for instance, if the maximum total displacement angle between the pump and the motor was 40°, the sector plates might provide an additional adjustment range of about 20° each. (Note: in prior art variators that use only sector plates to adjust angle, it is difficult to have large angle ranges because of the limitations of the porting slots between the sector plate and the housing. At some point these slots choke off the ports because of the extreme angle and efficiency will be lost.)

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e. meaning "might") rather than the mandatory sense (i.e., meaning "must"). Similarly, the words "include", "including", and "includes" mean including, but not limited to.

The invention claimed is:

1. A hydrostatic variator comprising:
a housing, first and second bent axis piston drive units each comprising a rotating group, a yoke, and a yoke servo assembly to position the yoke relative to the housing, the respective rotating groups being arranged to rotate within the yoke, wherein the yoke provides at least one fluid channel for fluid communication between the first and second bent axis piston drive units;
wherein the yoke is rotatable about a yoke axis perpendicular to a drive shaft of the first bent axis piston drive unit and to a drive shaft of the second bent axis piston drive unit to simultaneously alter an angle between the drive shaft axis and the rotating group axis of each of the first and second bent axis piston drive units;
wherein the rotating group of the first bent axis piston drive unit is arranged to be movable relative to the yoke to alter the angle between the drive shaft axis and the rotating group axis of the first bent axis piston drive unit independent of the second bent axis piston drive unit.

2. The hydrostatic variator according to claim 1 comprising a first movable sector plate coupled to the rotating group of the first bent axis piston drive unit that is arcuately movable within the yoke about a first sector plate axis perpendicular to the drive shaft axis of the first bent axis piston drive unit.

3. The hydrostatic variator according to claim 2 comprising a first servo assembly to position the first movable sector plate relative to the yoke.

4. The hydrostatic variator according to claim 2 wherein the first movable sector plate comprises an elongate opening to allow fluid to flow between the rotating group of the first bent axis piston drive unit and the fluid channel of the yoke independent of the arcuate position of the first movable sector plate.

5. The hydrostatic variator according to claim 1 wherein the rotating group of the second bent axis piston drive unit is arranged to be movable relative to the yoke to alter the angle between the drive shaft axis and the rotating group axis of the second bent axis piston drive unit independent of the first bent axis piston drive unit.

6. The hydrostatic variator according to claim 5 comprising a second movable sector plate coupled to the rotating group of the second bent axis piston drive unit that is arcuately movable within the yoke about a second sector plate axis perpendicular to the drive shaft axis of the second bent axis piston drive unit.

7. The hydrostatic variator according to claim 6 comprising a second servo assembly to position the second movable sector plate relative to the yoke.

8. The hydrostatic variator according to claim 6 wherein the second movable sector plate comprises an elongate opening to allow fluid to flow between the rotating group of the second bent axis piston drive unit and the fluid channel of the yoke independent of the arcuate position of the second movable sector plate.

9. The hydrostatic variator according to claim 2 wherein the yoke is rotatable to simultaneously alter the angle between the drive shaft axis and the rotating group axis of each of the first and second bent axis piston drive units over a range from 0 to about 40 degrees.

10. The hydrostatic variator according to claim 9 wherein the angle between the drive shaft axis and the rotating group axis of the first bent axis piston drive unit can be altered over the range from 0 to about 20 degrees independent of the second bent axis piston drive unit.

11. The hydrostatic variator according to claim 1 wherein the axes of the shafts of the first and second bent axis piston drive units are parallel.

12. The hydrostatic variator according to claim 1 wherein the axes of the rotating groups in the first and second bent axis piston drive units are not parallel.

13. The hydrostatic variator according to claim 1 wherein one of the first and second bent axis piston drive units is a pump and the other of the first and second bent axis piston drive units is a motor.

14. The method according to claim 1 comprising:
incorporating a first movable sector plate that is arcuately movable within the yoke about a first sector plate axis perpendicular to the drive shaft axis of the first bent axis piston drive unit; and
coupling the first movable sector plate to the rotating group of the first bent axis piston drive unit.

15. A method of altering the angle between the drive shaft axis and the rotating group axis of a first bent axis piston drive unit independent of a second bent axis piston drive unit in a hydrostatic variator, the hydrostatic variator comprising:
a housing, the first and second bent axis piston drive units each comprising a rotating group, a yoke, and a yoke servo assembly to position the yoke relative to the housing, the respective rotating groups being arranged to rotate within the yoke, wherein the yoke provides at least one fluid channel for fluid communication between the first and second bent axis piston drive units;
wherein the yoke is rotatable about a yoke axis perpendicular to a drive shaft of the first bent axis piston drive unit and to a drive shaft of the second bent axis piston drive unit to simultaneously alter an angle between the drive shaft axis and the rotating group axis of each of the first and second bent axis piston drive units; and the method comprising:

arranging the rotating group of the first bent axis piston drive unit to be movable relative to the yoke to alter the angle between the drive shaft axis and the rotating group axis of the first bent axis piston drive unit independent of the second bent axis piston drive unit.

* * * * *